United States Patent [19]

Severinsson

[11] 4,088,046
[45] May 9, 1978

[54] METHOD OF PRODUCING FORMING TOOLS

[75] Inventor: Lars Magnus Severinsson, Malmo, Sweden

[73] Assignee: H R B Tooling AB, Sweden

[21] Appl. No.: 642,376

[22] Filed: Dec. 19, 1975

[30] Foreign Application Priority Data

Jun. 24, 1974 Sweden ............................... 74082439

[51] Int. Cl.² .......................... B21K 5/20; B32B 31/00
[52] U.S. Cl. .................................. 76/107 R; 156/155; 156/289
[58] Field of Search ............ 76/107 R; 156/155, 246, 156/289

[56] References Cited

U.S. PATENT DOCUMENTS

| | | | |
|---|---|---|---|
| 3,195,374 | 7/1965 | Coffin | 76/107 R |
| 3,343,430 | 9/1967 | Haas et al. | 76/107 R |
| 3,631,745 | 1/1972 | Walkey et al. | 76/107 R |

*Primary Examiner*—Al Lawrence Smith
*Assistant Examiner*—James G. Smith
*Attorney, Agent, or Firm*—Bucknam and Archer

[57] ABSTRACT

This invention relates to the production of a forming tool comprising a mould or part which is formed on a master surface and separating the tool from the latter, in which a relatively malleable metal is deposited as a relatively thin metal layer on the master surface such that that side of this layer which faces the master surface will assume the shape and structure of the latter, whereupon on this layer at least another layer of a relatively durable metal is deposited and bonded for forming a metal shell. A backing material is bonded on the shell and the shell and the backing material are separated as a unit from the master surface and used as the mould or forming part of the tool.

23 Claims, 3 Drawing Figures

METHOD OF PRODUCING FORMING TOOLS

The present invention relates to forming tools of the kind which comprise a die or mould having a forming surface of metal and to a method of producing such tools.

BACKGROUND OF THE INVENTION

Forming tools for pressure forming of material, such as sheet steel, usually consist of steel, but pressure forming tools of another material or of composite materials are known.

Swedish patent specification No. 222,276 teaches the use of such pressure forming tools which substantially consist of a body of plastics having a preformed shell of sheet metal, which constitutes the forming surface proper. The idea is that, by backing this shell by means of a body of plastics, pressure forming of sheet metal even of greater thickness than that of the metal shell should be possible. It was found, according to the abovementioned patent specification, that it was necessary to protect the plastic body by using a heat-conducting metal bed between the metal shell and the plastic body, and such metal bed was applied to the rear surface of the shell by metallization and formed together with the preformed metal shell into a composite shell of greater thickness than that of the preformed metal shell in order to achieve a shell of sufficient metal material for the necessary heat absorption and dissipation.

This method involves problems as to the preforming of the sheet metal shell, its fragility and its susceptibility to deformation during handling and the metallization process and bonding to the plastic body.

Furthermore, U.S. Pat. No. 3,631,745 teaches a method of forming dies by so-called thermal spraying, i.e. a method of melting a metallic or ceramic material, normally in the form of wire or powder, in a source of heat and spraying the molten material in the form of droplets onto a surface to form a metal shell a layer. According to this method a matrix is produced by shaping or casting of a wooden or plaster pattern into the form of the die and casting an inorganic substrate over the pattern for forming the matrix. The matrix is cured and whereupon separated from the pattern. Then the matrix is preheated, and the metal which is to form the die is applied onto the preheated matrix by thermal spraying while the matrix is maintained at the same temperature as the metal. The matrix with the metal spray-applied is then placed in a pre-heated oven for slow cooling. Because of different contracting rates of the matrix material and the die material, the latter being titanium, the die is released from the matrix by crushing the matrix material e.g. in that it breaks by the stress forces during cooling. The cavity of the metal die so obtained is filled with a material mixture which, after cooling and hardening, forms a backing body imparting to the metal die the requisite stability and strength for use as a forming tool.

This method directed to special tools of titanium demands several die shell production operations comprising preheating in an oven and slow cooling; and in the production of a large but thin metal die, the die is inclined to be deformed at the separation from the matrix and until the filler in the cavity thereof has hardened.

According to another process disclosed by British patent specification No. 854,636 a forming tool is produced by forming a thin skin of metal over the mould surface of a pattern mould by deposition on that surface of a metal, casting an epoxy resin casting composition in the metallised mould, whereby the thin skin of metal becomes adherent to the surface of the casting, and thereafter removing the metallised casting so produced from the pattern mould. According to this British specification No. 854,636 the metal deposited must be chosen and its thickness controlled (limited) to avoid such distortion of the metal skin, which tends to arise when the thickness of deposited metal increases.

Another drawback of the known method is said to reside in that the production of a thick layer of sprayed metal is not feasible because of severe skrinkage stresses.

SUMMARY

The primary object of the present invention is to provide relatively cheap but accurately shaped durable forming tools for different operations, in particular for sheet-metal pressing and pressure forming and compression moulding of other formable material.

Another object of the present invention is, by further development of the prior art methods and by elimination of their disadvantages, to provide for an economical manufacture of a metal mould shell of desired thickness and for backing of this mould shell with support material without the risk of deformation of the shell for the production of forming and moulding tools according to the invention.

Another object of the invention is to provide such a method, by which a metal shell layer of relatively hard metal is formed on a layer of relatively soft metal for forming a relatively thick composite metal shell without detrimental stresses.

A further object of the invention is to deposit metal on a pattern mould or matrix by thermal spraying of metal in at least two superimposed layers such that metal in one layer will stabilise and at least in some degree densify an adjacent metal layer.

A further aspect of the invention relates to the provision of a strong bond between the metal shell and a backing body which may be formed of plastic material such as epoxyplastic or other material which includes metal, ceramics and cement possibly reinforced by fillers.

These and other objects will appear from the following specification and the accompanying drawing.

BRIEF DESCRIPTION OF THE DRAWINGS

The invention will be described in greater detail hereinbelow in the form of illustrative examples with reference to the accompanying schematic drawing; in which FIG. 1 somewhat schematically shows a two-part, divisible mould formed according to the invention on a pattern and consisting of two separable halves comprising each a metal shell and an associated supporting body formed by suitable backing material which is bonded to the shell.

Figure 1:
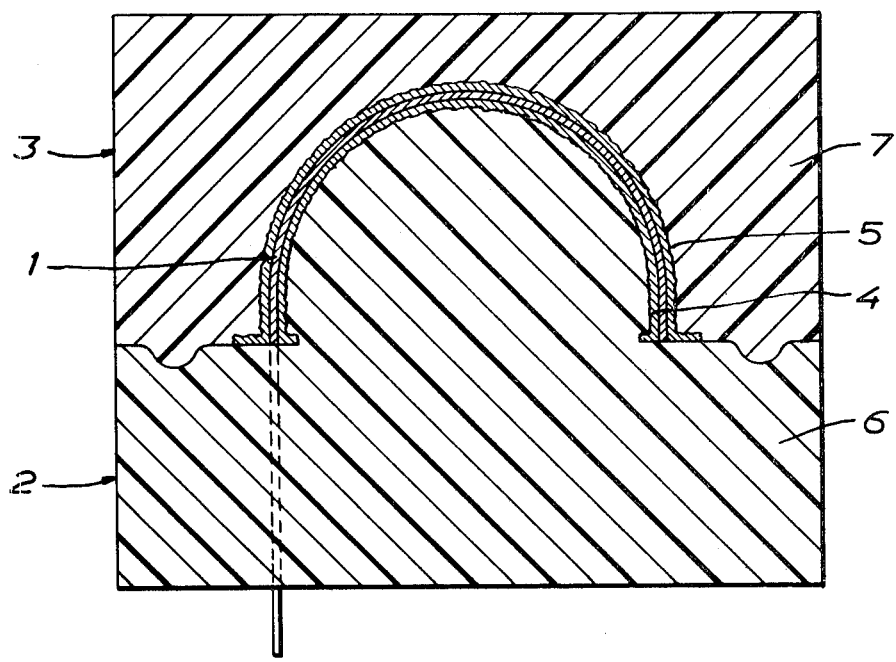
FIG. 1 shows as a non-limitative example a forming tool for pressing sheet metal into the form of a headlight reflector hood, but this example has been chosen merely to illustrate the invention, it being understood that forming tools may be made according to the invention for the forming of materials within a very broad range, including for example, also the plastics moulding industry.

A model of the headlight reflector may be used as a master or pattern for the sheet-metal pressing mould in FIG. 1 for reproduction of headlight reflectors. However, use may also be made of a previously manufactured reflector 1 of sheet metal, that is to say an original part, this variation being taken as understood in the following description as an important aspect of the invention.

A two-part mould consisting of a male part 2 and a female part 3 is produced on this sheet-metal original part which serves as a pattern. Each part 2 and 3 consists of a mould shell of metal 4 and 5, respectively, and a supporting body 6 and 7, respectively, which is bonded with the rear face of the respective mould shell and consists of a material other than that of the mould shell.

The metal mould shells are produced by the prior art method, described by way of introduction and called thermal spraying, the female part and the male part being produced in the same way, preferably on one and the same pattern.

The production of the mould shells of the mould parts is preferably effected in such a manner that one shell part is first formed on the pattern 1 and then, or alternatively after the formation of the other shell part on the same pattern and while the respective shell part is still on the model, the supporting body is formed on the respective shell part.

For the production of one shell part a thin covering layer 8 is first applied to one side of the thoroughly cleaned sheet metal pattern 1. The material in the layer 8 should have the following properties:

(a) The material should be capable of forming a thin layer of a well-covering coating whose surface of contact with the surface of the pattern should in its contour accurately conform to the pattern surface and whose side facing away from the pattern surface should have approximately the same contour;

(b) the material should not attack nor be attacked by the pattern surface and should, in the utilized application method, be releasably bonded to the pattern surface by binding forces which retain the covering layer 8 to the pattern surface without being peeled away at any point from the surface on the subsequent application of metal by thermal spraying in accordance with the above-described prior art method and by means of prior art equipment;

(c) the material should permit formation of a continuous metal layer on the covering layer 8 by thermal spraying;

(d) the material should permit separation, by means of a simple procedure, of the mould (the mould shell with the supporting body) from the pattern, with the metal shell completely intact;

(e) the material should make possible the application of metal in accordance with points $b$ and $c$ without any penetration of sprayed metal particles through the covering layer 8 to the pattern surface. The material should either 1) be of a negligible thickness and display a smooth outer face closely following the contours of the mould and preventing penetration of sprayed metal particles while being releasable from the metal shell, or 2) permit bonding with the sprayed metal and primarily penetration of sprayed metal particles to a certain depth (preventing, however the metal particles from penetrating to the pattern surface and being "welded" thereto), the cover layer material in this case forming part of the mould shell proper and being releasable from the pattern surface.

Metal is applied in one or more layers to the covering layer 8 by thermal spraying for the production of a metal shell 9. The metal employed in the spraying process should have the following properties:

(f) the metal shall either be capable of forming a metal shell which is easily separable from a covering layer 8 produced in accordance with point $e_1$ or be capable of forming a metal shell together with the covering layer 8 produced in accordance with point $e_2$, the metal shell in both cases having an inner surface whose contour closely follows that of the mould;

(g) the metal should, in the employed method of application (thermal spraying) form a rough or porous rear face for facilitating a fixed bond with the support body forming material;

(h) the metal should, in the selected thickness, form a stable shell with sufficient strength properties for the work to be carried out by the forming tool in question, and if great demands are placed on these properties it can be advantageous, or necessary, to produce the metal mould shell as a composite shell consisting of several metals or alloys, for example with a wear-resistant surface layer 9' and a hard, strong body layer 9'', in which case the metals in the chosen method of application should provide a stable bond with each other.

The metal shell produced in this manner is subsequently stabilized in that its rear face is backed with a support body forming material, for example 7, which should have the following properties:

(i) it should be possible for the support body forming material, by a simple operation, to be formed and secured in a solid bond with the rear face of the metal shell 9;

(j) the support body forming material should prevent the mould shell from being deformed by the forces produced in the use of the forming tool and should not itself deform the mould shell during the hardening of the support body forming material or by the prevailing working temperatures;

(k) the support body forming material itself should naturally withstand the pressure forces to which it is exposed;

(l) moreover, if the metal shell is exposed under working conditions to extreme heat, it may be necessary for the support body material to be heat conducting or to contain a heat dissipating medium.

It is probable that there are, among all of the conceivable material combinations, many which satisfactorily comply with the conditions described above under points $a$–$l$ dependent upon the contemplated field of use for the produced forming tool and dependent upon the pattern material and the pattern contour. Consequently, the choice of materials and the embodiments described below should be considered only as preferred examples of the invention applied to the production of forming tools intended for operations in which great demands are placed on the material of the tool, such as pressure moulding of metal, for example, sheet metal for the pressing of motor car body panels or other motor car parts or, for example, the compression moulding of plastics under high pressure.

In the given example, in which an original part of sheet metal is used as a pattern, the first covering layer or separating layer 8 is also produced preferably by thermal spraying of metal. This metal should be soft and should have a relatively low melting point, such as for example, tin, lead or zinc. Of these metals, lead should preferably not be used because this metal may give rise to a polluted atmosphere on thermal spraying and does not yield any appreciable advantages in relation to tin. Neither of the two remaining metals, tin and zinc, complies in a fully satisfactory manner with all of the conditions disclosed under points a–e. Certainly, tin permits the production of a thin layer which closely follows the contour of the mould and has a dense smooth surface structure, but pure tin has a tendency to flake off from the substrate because of termal stresses during the layer build-up and the subsequent spraying for the production of the mould shell 9 of harder metals. Furthermore, pure tin also has a tendency to allow these harder metal particles to pass so that they reach the sheet metal pattern 1 and adhere to it. Besides, the working surface of the mould shell can become rough due to particles of harder metal that penetrate to the pattern surface, thus increasing the tendency of the tin layer to shred during the spraying operation. On the other hand, a thin zinc layer does not allow particles of harder metal sprayed thereonto to pass as easily as does a thin tin layer but stops and "welds" to these particles. However, it is difficult, using thermal spraying of zinc, to produce a satisfactorily even surface which does not "weld" to the sheet metal surface thereby making the separation difficult or being damaged in the separation process.

However, it has proved that a suitable mixture of zinc and tin is an excellent material for the production of an efficiently covering, relatively easily releasable layer 8 which is not penetrated by particles of harder metal carefully sprayed thereonto and which, therefore, prevents the harder metal from welding to the pattern surface. Thus, the zinc in a tin/zinc layer seems to stop the harder metal particles and bind to them, whereas the tin contributes to the formation of an even surface which reproduces the contour of the pattern, the total effect being that the first harder metal particles sprayed on penetrate into the tin/zinc layer without fully penetrating it, whereby good bond is obtained between the layers at the same time as a good metal hardness can be achieved practically up to the pattern surface. The amount of tin in the tin/zinc mixture should be greater than and preferably at least twice as great as the amount of zinc. In a preferred mixture four times as much tin as zinc is used, in other words approximately 80% tin and approximately 20% zinc.

The tin/zinc mixture in the form of powder or wire is applied by thermal spraying, for example using a powder or wire spray gun of the METCO ® make. The spraying can be carried out direct onto the metal pattern 1 for the production of as thin a release layer 8 as possible without the layer being pierced by subsequently sprayed particles of harder metal. Normally, the layer thickness need not exceed 0.2 mm but can be substantially thinner, for example, 0.1 mm or even thinner. The spraying should be carried out at carefully regulated temperature conditions. For example, the metal pattern can be cooled during the spraying, or the metal can be applied in several passes, the pattern and the applied metal being cooled before each new pass. If the metal becomes too hot at any point, the tin/zinc layer has a tendency to come loose from the substrate.

For the same reason, the subsequent spraying of other metal on the tin/zinc layer 8 should be carried out with great care.

The metal shell which is to form the mould shell proper (in which the thin tin/zinc layer is incorporated) is then produced on the tin/zinc layer 8.

For realizing a mould shell with a mould surface of great wear resistance, a metal which distinguishes itself for this property is first sprayed onto the tin/zinc layer 8. In the present instance molybdenum is sprayed directly onto the tin/zinc layer 8 to form a layer 9' of suitable thickness, for example, 0.1–0.2 mm. By thermal spraying it is possible to produce a molybdenum layer which binds to the subjacent metal, in particular the zinc and possesses a total layer hardness of approximately 37 RC.

Figure 2:
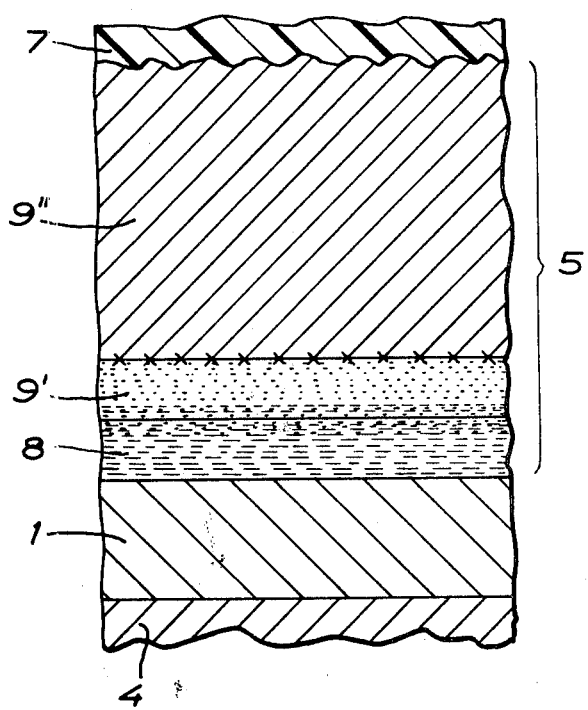
FIG. 2 is a fragmentary cross-sectional view taken substantially along the line II—II in FIG. 1 but illustrating, on an enlarged scale, a modification of the composite metal shell.

In FIG. 2 is given a purely schematic illustration, by means of dots, of the penetration of the molybdenum particles into the tin/zinc layer and of the incorporation of the tin and zinc particles (which are shown by means of small dashes and predominantly consist of tin) in the molybdenum layer, a mixed zone being obtained in a boundary layer.

A high-grade metal alloy, such as chromium steel containing approx. 0.35% C, approx. 0.35% Mn, approx. 0.5% Ni and approx. 13% Cr, is then sprayed onto this wearing layer 9'. This low-shrinking, high-strength alloy, which possesses very good spraying properties (yields dense, almost pore-free layers) is sprayed onto the wearing layer 9' to form a layer 9" of the desired thickness, for example, in the present instance, a thickness of up to 0.5 mm or more. The metal binds excellently to the subjacent metal which, in this case, is molybdenum, and provides a layer hardness of approximately 300 Brinell.

As was the case with the tin/zinc layer 8, the molybdenum layer 9' and the chromium steel layer 9" are built up successively and carefully by application of metal in several passes in order to prevent release.

Thus, in the present example, the mould shell forms a composite metal shell consisting of a release layer 8, a wearing layer 9' and a strength providing layer 9" with an application thickness of about 0.1, 0.15 and 0.6 mm, respectively. However, the pure tin/zinc layer remaining after the application of the layer 9' may be extremely thin ("lubrication layer").

Although this composite layer can be separated from the pattern 1 as an intact mould shell and subsequently coupled to a support material, the mould shell — if of reasonably large size — can easily be deformed during this handling so that the forming tool will be worthless. Consequently, the present invention calls for the production of the support body on the mould shell before the mould shell is removed from the pattern. Certain curable plastics having the necessary strength properties after curing are suitable as support materials possessing the properties disclosed under points i–l. A further demand which must be placed on the material is that it should form a secure bond with the rear face of the mould shell by a simple method of application (casting) and that its volume during curing does not change to such an extent that it deforms the mould shell or clamps the mould shell against the male or female parts of the pattern 1 so that separation is made more difficult. Finally, the coefficient of thermal expansion should not be so great that the shell is damaged or deformed when the tool is used.

A plastics material which has proved to be particularly suited is epoxy resin, for example ARALDIT ®, C-8 ®, DEVRAN ® and EPON ®, which all display a very low level of shrinkage, provide good bonds and do not give off volatile by-products.

After the production of a mould shell and a support body 6, 7 on either side of the pattern 1 (please see FIG. 1) and curing of the support body forming material for the requisite time, the male and female parts 2, 3 are separated from the pattern 1 under such conditions that the mould surfaces are not damaged. This separation is easily carried out if the pattern 1 is of easily releasing shape. In other cases, however, the separation may meet with difficulties. Both mould halves 2, 3 may be separated relatively easily from each other if a releasing agent is applied to the interface of one support body to the other support body before this latter body is shaped. Moreover, the mould shell of one mould half will in any event be released from the pattern 1 by separation of one mould half from the other. If, because of complicated contours, either side of the pattern 1 occasions difficulties in release and is retained fixedly attached to the mould shell after separation of the two mould halves, the difficulties in achieving the separation may increase because there is no point of attack for separation forces. When, as in the present case, the pattern 1 is in the shape of a cup of sheet metal with edges which are not easily accessible, and particularly when the cup adheres to the female part 3, the problem can be solved by providing, in the plastic body, removable air hole plugs as intimated at 10 in FIG. 1, which, after removal, leave channels through which compressed air can be forced to the region between the respective mould shell and the pattern. In this way it is possible in many cases to release the mould and the pattern in a simple manner. The air holes can then be filled with the same plastics as is used in the plastics body.

The separation process can also be realized or facilitated by vibration.

Another possibility is to fix a handle onto that surface of a pattern 1 which is exposed on separation of the two mould halves. This handle can be fixed by means of an adhesive, for example, epoxy resin, or by soldering or welding. By exercising force between the mould (2 or 3) and the handle connected to the pattern, the mould with the metal shell can be separated from the pattern.

It has been supposed in the foregoing that the mould shell is produced as a composite shell substantially of molybdenum and chromium steel, but the mould shell can be produced solely from the above-described chromium steel alloy or from any other alloy which has the suitable properties for the contemplated use of the mould. It is also possible to produce a mould shell of metal which after application is sintered, it being possible to apply such metal on the molybdenum layer by so-called gas or plasma spraying while the sintering can be carried out, for example, by means of a gas flame.

The above-described tin/zinc mixture for the production of the release layer 8 (a mixture which in practical experiments has given very positive results) could probably be replaced by other metals, for example, certain tin-based bearing metals, brass etc. It is also possible to use materials other than pure metals and it is further possible to use other application methods for the release layer than thermal spraying. An example of such alternative material (which has also in practical experiments given positive results) is molybdenum disulphide which may be obtained in fine powder form together with an aerosol fluid carrier in a spray can. A layer of molybdenum disulphide permits the application of metal on the layer by thermal spraying and facilitates the release of the shell from, for example, a metal substrate.

Figure 3:
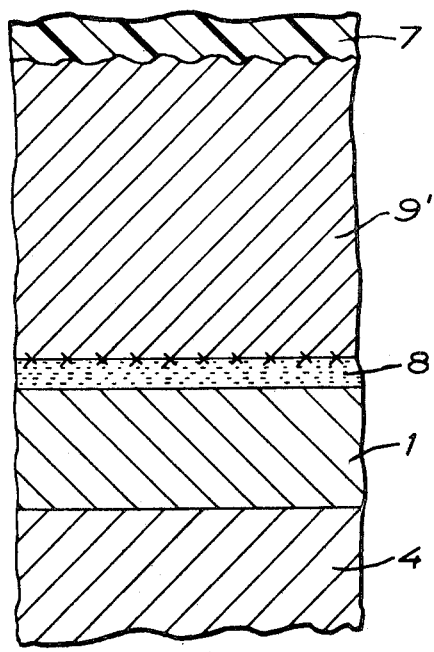
FIG. 3 is a view corresponding to FIG. 2 but showing another modification of the composite metal shell.

FIG. 3 illustrates a chromium steel shell 9a which has been produced on a molybdenum disulphide layer 8a of a thickness of less than 0.1 mm, sprayed onto the pattern 1.

As was mentioned under point 1) above, it may be necessary that the support body forming material be heat-conducting or contain a heat dissipating medium.

For example, the support body forming material could be produced by casting a light metal alloy of low melting point. Another possibility is to produce the support body from material, for example, epoxy resin, to which metal powder is admixed, but other materials are also conceivable, for example, a mixture of cement (Portland cement) and epoxy resin in a ratio of, for example 20/80 and to which may be admixed metal particles such as aluminium, in a suitable amount, or iron metals.

It should be emphasized that the pattern material need not be metal. The above-described method of producing mould shells of metal by thermal spraying can be carried out on many other pattern materials, in particular if the pattern surface is first coated with a releasing agent which permits the shaping of the metal shell on the pattern surface and permits the separation of the mould shell from the pattern or the pattern material. As will be apparent from the following description, the expression "separation" includes, in its broadest meaning, the possibility that the mould shell, after backing with a support material, is released from the pattern, this being also possible, for example, by dissolving the pattern material using a suitable solvent.

Neither does the method according to the present invention preclude the possibility that the mould shell can be hardened at any stage before or after the separation from the pattern. Thus, the hardening can be carried out either before or after the mould shell is bonded to the support material. If the mould shell is to be heat-treated at high temperatures after bonding to a support material, the support material or at least the interface (the transition or bonding zone) between the support material and the mould shell must tolerate this heat-treatment or be protected from injurious temperatures, for example, by carrying out the hardening in a per se known manner with the support body immersed in a cooling bath and with the metal shell located wholly or partially in the bath.

The structure of the mould surface of the metal shell can be improved by a metallization method recently developed in metallurgy and thus known per se, in which method vapourized metal is deposited in a vacuum on a substrate. This method or a spraying method known as "sputtering" (spraying of metal ions) makes it possible to produce, on a substrate, hard dense wear-resistant metal layers closely conforming to the structure of the substrate, for the preparation of mould shells having an outer layer with surfaces intimately conforming to the mould contour.

In an example of the application of such a method for the production of mould shells, use is made of a plastics pattern with a dense, relatively pore-free surface of epoxy resin. The pattern was washed in 99.5% ethanol and placed in a vacuum plant of the Edwards Speedivac 6E2 type for evacuation. The evacuation was maintained for 90 min (the relatively long evacuation time depended upon the gas content of the plastics material). The metal vapourization and application was then carried out at a background pressure of approximately $10^{-5}$ torr. The metal used was chromium which was vapourized with the help of a tungsten filament at a current strength of 40 A. The treatment was carried out twice, a layer of about 3000 A being applied each time. The total layer thickness after both treatments was about 5000 A.

The resultant layer proved to be very even and reproduced extremely accurately the contour on the front face (that is to say the contact face relative to the plastics pattern and thus, the negative surface picture of the pattern on the layer).

Moreover, it might be mentioned that at the above-indicated layer thickness, the rear face of the layer displayed a positive image of the pattern surface which very intimately conformed to the pattern contour, and that this fact is interesting since it shows the possibility of applying a thin, but wear-resistant dense layer directly onto the mould surface of a mould shell after the shaping of the mould shell and practically without distortion of the mould dimensions or surface structure.

In the above described example, in which a layer of a thickness of 5000 A was first applied to a pattern consisting of plastics, the layer could be built up by means of different metals by thermal spraying using commercially available spray equipment. With the use of metals binding with or preferably forming alloys with the substrate metal, in this instance chromium, uniform thick metal layers could be built up in particular by the so-called plasma spraying process (in which the additive in the spraying apparatus is melted by means of a so-called plasma stream of ionized gas whose temperature is very high, for example about 10,000° C) on the rear face of the thin metal surface layer with a firm bond to said thin metal surface layer. For example, spraying with molybdenum provided very hard, dense layers with properties desirable for use in forming tools. Moreover, the molybdenum layer could be used as a substrate for the spray application of other metals and metal alloys. Naturally, other metals or metal alloys, for example, chromium steel, can be applied, instead of molybdenum, onto the chromium layer produced by metal vapourization in a vacuum. The layer should have a thickness which provides sufficient heat dissipation on the subsequent building-up of the metal by thermal spraying.

In practice, it is possible to produce, by metal vapourization, thin metal layers which consist of a metal alloy. For this purpose, two or more vapourization sources can be used for pure metals or a single source for the metal alloy. In the latter case, the correct proportions for the desired alloy are obtained automatically.

For the separation of the mould shell whose mould surface is produced by application of metal in the vapour phase directly onto a pattern in a vacuum chamber, the pattern should consist of material which can be dissolved by means of a solvent without damaging the metal. If the pattern consists of plastics, the dissolution can be effected by means of organic solvents.

Another method which renders the dissolution of the pattern material unnecessary is to first apply onto the pattern a thin layer of a releasing agent, for example, molybdenum disulphide or tungsten disulphide. These and several other release-facilitating agents suitable for application to the present invention are available on the market in the form of suspensions of extremely fine particles in a fluid carrier in aerosol containers, such as several of the products sold by Cerac Corporation (USA) as "lubricants" under the designations SP-101-117.

The release layer can be so thin that it does not distort either the dimensions or the designs.

It is also possible to apply, onto the second metallic layer shell, thin surface layers of suitable metals or metal alloys with a minimal change of the contours and dimensions in that the application thickness and evenness can be regulated very exactly. A mould shell produced according to the invention can consequently by provided with a suitable surface even after the separation from the pattern and bonding with a support material.

It should be observed that the above-indicated layer dimensions are not critical limits. For example, it is possible to apply sufficiently thick tin/zinc layers on substrates by thermal spraying to permit using the layer, for the moulding of plastics objects, as a metal mould shell on a support body of, for example, epoxy resin connected, in the described manner, to the rear face of the layer. Moulds with very fine surface structures, for example, synthetic leather surfaces, can be produced in this way and be used for the pressure forming of easily formable materials which do not deform the fine tin/zinc layer contours.

It should further be noted that harder metals can also be built up into thicker layers than those indicated above, by thermal wire spraying, plasma spraying, ionized spraying ("sputtering") and metal vapourization, and that all of these methods can be used separately or in selected combinations.

The described metal vapourization in a vacuum can be used for the production of very hard, thin wear surfaces but may also be used for the building-up of substantially thicker layers than those indicated above; and even the so-called "sputtering method" (for example, with equipment from the U.S. company Randex Incorporated) can be employed for the production of such layers or even entire mould shells. According to this latter method it is, for example, possible to build up extremely dense metal shells of pure metals or of alloys at a rate of from hundreds to several thousand A/min.

A further interesting possibility is to intentionally produce a porous metal shell and fill the shell with another metal by an infiltration technique. The porosity can be regulated by control of the temperature during the thermal spraying process or of the temperature during the building-up of the layers by the metal droplets (the distance between the spray nozzle and the surface which is being build up). The porous metal shell of, for example, steel may be filled with a metal of a lower melting point which fuses into the metal shell structure. The metal shell can be hardened in conjunction therewith or at a later stage. By filling of the pores with a suitable metal, it is possible to compensate for shrinkage tendencies. The filling of the pores with another metal may also be carried out by the infiltration of metal in a metal salt bath, for example, nickel and, for example, by so-called currentless metal deposition. Infiltration of plastics for a surface coating of plastics, for example, Teflon ®, may also be carried out. On the infiltration of a suitable metal, for example, nickel or copper, suitable hardening can be carried out at a relatively low temperature. Support bodies of sintered metal power can be bonded with the metal shell. At low sintering temperature, so that only an initial sintering of the metal granules occurs, a porous support body will be obtained into which a metal of lower melting point can be fused in accordance with the above description. Thus, without it being necessary to use impermissibly high temperatures for the metal shell, the shell can be bonded with a strong support of metal and it is possible in this way to produce forming tools which are almost equally as good as tools produced in a conventional manner from metal, but at a fraction of the price for these latter tools.

What I claim and desire to secure by Letters Patent is:

1. A method of producing a forming tool having a mold shell of metal, the shell having a surface shaped by a pattern body and having a support body bonded to the rear face of the mold shell, which comprises preparing a pattern of predetermined shape, applying a first layer of metal on each side of said pattern to conform to the contour of said pattern, applying a second layer of metal by thermal spraying, the two metals forming a bond which is substantially mechanically inseparable, the first metal being soft and of low melting point, the second metal having high wear resistance properties, thus forming a two-part mold shell consisting of a male part and a female part on said pattern, each part consisting of a mold shell of said two metals, bonding the rear face of the mold shell to a support body material and then separating the male and female part from said pattern.

2. The method according to claim 1 wherein the rear face of the mold shell which is to be fixedly bonded to the material of the support body has a rough surface.

3. The method according to claim 1 wherein a mixture of tin and zinc is thermally sprayed for the production of said first metallic layer on the pattern.

4. The method according to claim 3 wherein the mixture contains between about two and four times as much tin as zinc.

5. The method according to claim 1 wherein the first metallic layer is easily releasable and is applied by thermal spraying to a thickness sufficient to form a homogeneous layer which completely covers the countour surface of the pattern and does not allow passage of the metal of said second layer to said pattern.

6. The method according to claim 1 wherein the second layer of metal is molybdenum.

7. The method according to claim 1 wherein a chromium steel layer is applied upon said two metallic layers.

8. The method according to claim 7 wherein the chromium steel layer is produced by thermal spraying of a low-shrinkage chromium steel alloy which contains about 7–15% chromium.

9. The method according to claim 8 wherein the chromium steel alloy is an alloy consisting essentially of about 13% Cr, about 0.35% Mn, about 0.5% Ni and about 0.35% C apart from iron.

10. The method according to claim 1 wherein a thin surface layer of hard, wear-resistant metal is applied onto said second metallic layer and said surface is produced by application of metal vapour in a vacuum.

11. The method according to claim 10 wherein the thin surface layer is applied after the bonding of the metal shell with the support body and release of the mold consisting of the metal shell and the support body from the mold pattern.

12. The method according to claim 1 wherein the support body is produced by a casting onto the rear face of the mold shell.

13. The method according to claim 12 wherein the support body is produced by a casting of epoxy resin.

14. The method according to claim 12 wherein the support body is produced by a casting of a mixture of cement and epoxy resin or of cement, epoxy resin and metal particles, the metal particles being iron and aluminum or aluminum.

15. The method according to claim 12 wherein the support body is produced by a casting of a metal of low melting point which is aluminum or a light metal alloy.

16. The method according to claim 1 wherein the first metal layer is produced by thermal spraying of tin, zinc, lead, a mixture thereof, brass or molybdenum disulfide.

17. The method according to claim 1 wherein the second metal layer is applied in the vapor phase in a vacuum.

18. The method according to claim 1 wherein one mold shell is bonded with said support body before the second mold shell is produced and bonded with a further support body.

19. The method according to claim 18 wherein the application of metal for the production of the second mold shell on the pattern is carried out so as to coat adjacent edge surfaces of the support body on the first-produced mold shell with metal.

20. The method according to claim 1 wherein the mold shell is porous and the pores are filled with a metal of melting point lower than the metal of said mold shell.

21. The method according to claim 12 in which the support body is produced by sintering of metal powder at a relatively low temperature so that the metal powder granules in the metal powder matrix which is to form the support body adhere to the mold shell and to each other without a complete fusion of the metal powder matrix, whereby a support body with a plurality of pores is formed and wherein the pores are subsequently filled with another type of metal capable of compensating for the shrinkage tendency of the support body.

22. The method according to claim 21 wherein said metal capable of compensating for the shrinkage tendency of the support body is a metal of a lower melting point than that of the metal which forms the shell and is a metal which permits a hardening heat-treatment of the entire support body and the shell.

23. The method according to claim 1 wherein a releasing agent is first applied to said pattern.

* * * * *